United States Patent [19]

Davis, Jr.

[11] 4,020,281
[45] Apr. 26, 1977

[54] ITERATIVE COORDINATE DATA APPROXIMATION SYSTEM FOR PHOTOEMISSIVE PIXEL PATTERN DISPLAYS

[75] Inventor: John Ephraim Davis, Jr., San Jose, Calif.

[73] Assignee: International Business Machines Corporation, Armonk, N.Y.

[22] Filed: Feb. 13, 1976

[21] Appl. No.: 657,788

[52] U.S. Cl. .............................. 178/18; 340/324 A; 340/146.3 AC
[51] Int. Cl.² ................... G08C 21/00; H01J 29/46
[58] Field of Search ............ 340/324 A, 146.3 AC, 340/146.3 D, 146.3 Y; 235/92 PC; 178/18, 19; 250/549, 203 CT; 315/12 R

[56] References Cited

UNITED STATES PATENTS

| | | | |
|---|---|---|---|
| 3,315,229 | 4/1967 | Smithline | 235/92 PC |
| 3,506,875 | 4/1970 | Watanabe et al. | 340/324 A |
| 3,873,974 | 3/1975 | Bouton et al. | 340/146.3 AC |
| 3,917,955 | 11/1975 | Inuiya | 340/324 A |

*Primary Examiner*—Thomas A. Robinson
*Attorney, Agent, or Firm*—George E. Roush

[57] ABSTRACT

Almost any Photoemissive Pixel Pattern Display Tube (PPDT) System, such as one for a Photoemmisive Matrix Display Tube (PMDT) display system is capable of supplying an indication of coordinate data for input to data processing systems and the like with this electronic photoresponsive data approximation system. A photoresponsive probe with relatively large optical aperture stop is coupled to suitable electric current amplifying circuitry which in turn is coupled to data resolving circuitry for gating counting circuitry coupled to the display matrixing circuitry for determining the coordinates of the location of the probe in terms of the geometrical dimensions of the display. The probe is arranged for sensing a predetermined differential in photoemission as the cathode ray beam passes through the aperture stop. Conveniently, the aperture stop is circular and from the top the successive intercepted raster scans are longer up to the center of the stop. The electronic circuitry responsive to the probe is arranged for timing the beginning of each scan as intercepted. Upon timing the maximum duration of interception at the center of the aperture stop, one coordinate, $y$, is determined. The other coordinate, $x$, is then determined by averaging the time of beginning and the time of ending this central intercepted scan. Alternately, this $x$ coordinate is determined by locating the central point of this central intercepted scan. The technique is applicable to polar coordinate ($\rho,\theta$) data systems and to spiral and serpentine scan systems with only slightly more complex circuitry required. Variations in photoemissivity as the information is displayed are less effective in the determination than in the conventional systems and the approximation system is compatible with almost all photoemissive matrix display systems.

15 Claims, 9 Drawing Figures

KEY TO

ITERATIVE COORDINATE DATA APPROXIMATION SYSTEM FOR PHOTOEMISSIVE PIXEL PATTERN DISPLAYS

The invention relates to coordinate data determination systems (CDDS) for active display systems and it particularly pertains to such a system for photoemissive displays which exhibit slow changes in emissivity with time and/or small changes in emissivity from picture-element (pixel) to pixel.

Conventional cathode ray tube (CRT) display systems are often connected to coordinate data determination systems (CDDS), such as the one described in U.S. Pat. No. 3,571,510 of Richard Dean Weir issued on the 16th day of March 1971, and are extremely effective. A different system operating equally effectively and affording a high degree of compatibility with displays other than CRT displays is the acoustic coordinate data determination system described in U.S. Pat. No. 3,692,936 of John Stuart Moffitt issued on the 19th day of Sept. 1972. The latter CDDS is an overlay arrangement which inherently requires a greater optical gradient. The advantage of synchronizing the CDDS with the display system in a simple manner is also lacking, although in many respects this is not at all detrimental.

The prior art shows evidence of the problems for which the circuitry according to the invention offers a solution. Examples of such prior art pertinent to the development of the invention are found in the following U.S. patents:

| | | | |
|---|---|---|---|
| 2,553,245 | 5/1951 | Espenschied | 178/18 |
| 3,394,366 | 7/1968 | Dye | 340/324 |
| 3,505,561 | 4/1970 | Ward et al | 315/18 |
| 3,506,875 | 4/1970 | Watanabe et al | 315/12 |
| 3,651,508 | 3/1972 | Scarborough et al | 340/324A |
| 3,659,281 | 3/1972 | Mori | 340/324A |
| 3,680,078 | 7/1972 | Baskin et al | 340/324A |

The patent to Espenschied represents perhaps one of the earliest approaches to coordinate data determination systems. The cathode ray tube here is an iconoscope having a photoresponsive target assembly scanned by the cathode ray beam moved in accordance with a two-dimensional beam deflection system, essentially like that used in the earlier cathode ray display systems. The data is obtained directly from the deflection system in this arrangement because the probe is a light pen for directing a beam of light onto the target assembly. The intensity of the otherwise steady electron beam is altered as a point of light is scanned and the resultant change in intensity of the beam is reflected into the deflection system whereby the data is automatically coordinated with the dimensions of the target assembly. While the arrangement according to the invention and the arrangement to Espenschied have much in common, the circuitry according to the invention depends on a difference in photoemissivity of the target assembly due to modulation of the electron beam, or the equivalent thereof, and no energy is conveyed from the probe to the target assembly.

The patent to Dye is directed to a CDDS wherein the display comprises a cursor only which is first displayed on the screen or target assembly which is then picked up by a photoresponsive probe. A symbol generator for generating the cursor display signal and the probe are connected to the beam deflecting circuits for determining coordinate data principally for redirecting the display of the cursor. Digital data circuits in the system both provide digital data which may be utilized, as by a data processing system for example, and updated for movement of the cursor. While the probe does respond to a multiple of illuminated lines forming the cursor, it is limited in operation with the disclosed circuit arrangement to averaging the light impinging on the whole area of the probe aperture stop and does not provide any averaging of the duration of the scan of the cathode ray beam across the aperture stop.

In their patent, Ward and Stratton disclose a CDDS which is computer controlled and has a probe connected to the deflection system and which has an aperture stop large enough to view a small pattern of spots upon the CRT target, which fixed spot pattern must be generated each time this particular CDDS is used, and the difference between the amplitude of the probe output voltages at these spots is measured. Equal amplitudes will indicate positioning of the probe between the two pattern spots, which data is then extracted from the deflection system and utilized as desired. This system will not, however, extract data in accordance with the pixel forming the information display.

The patent to Watanabe et al is perhaps the closest art pertaining to the invention. In the disclosed arrangement, a photosensitive probe is provided with a large aperture stop and an electronic store is loaded with values relating to the entrance and exit of a cathode ray beam generated light spot into the field of the aperture stop. Measurements are made both on the $x$ and the $y$ axis whereby the center position of the probe is determined from the stored values to an approximation which is rough with respect to the CDDS of the art prior to the Watanabe et al invention, but the sensitivity of the probe to much smaller differences in light emissivity is definitely an advantage. The circuit arrangement of this patent does not encompass the determination of the exact path of the electron beam through the center of the aperture stop nor does it contemplate the averaging of a consecutive series of increasing time periods for bettering the precision of the ultimate data determined.

The patents to Scarborough et al, to Mori and to Baskin et al are directed to electronic circuit arrangements having a plurality of registers and logical gating elements for determining data relative to the coordinates of a probe that are similar in circuit configuration and arranged to function in a somewhat similar manner toward different ends and therefore comprising different circuit arrangements. The Scarborough et al patent in a CDDS in which vectors of decreasing length are generated to detect the position of a probe without determining the center of the probe aperture stop. Furthermore, a vector display generator circuit must be used and vectors other than the information to be displayed must be illuminated on the CRT target assembly, which disadvantage is obviated by the circuitry according to the invention. The arrangement of Mori, as disclosed in his patent, is based on an arrangement wherein the aperture stop of the light probe is held at different distances from the faceplate of the CRT whereby the effective aperture stop is varied and the tracking speed is thereby also varied proportionally. The Baskin et al patent is directed to CDDS having a photosensitive probe with two similarly shaped aperture stops side by side for computing the location of the probe in accordance with the angle of the axis common to the two aperture stops and the centroid of the individual areas of the two probes. Because the functions of the arrangements described in these patents differ from that of the instant invention, the circuitry according to the invention also differs substantially.

According to the invention, the location of a desired picture element (pixel) of a photoemissive matrix pattern display is determined by electronic apparatus indexed to electronic circuitry matrixing the display pixel by pixel, as for example, in a raster scanning CRT display tube. A photoresponsive probe is constructed with an aperture stop placed in proximity to the display at the location of the pixel to be determined. This aperture stop is substantially larger than the pixel of the display in contradistinction to the conventional probe, which has at least an equivalent aperture stop that ideally encompasses a single pixel and actually encompasses so few more than one that the average light from these few pixel is satisfactory for determining coordinate data with a CRT display for many applications. This larger aperture stop according to the invention is therefore arranged essentially for averaging successive detections of predetermined photoemissive intensity levels on a temporal basis rather than on a quantitative light basis at a given instant of time. Electronic circuitry coupled to the probe is arranged for gating counting circuitry coupled to the display matrixing circuitry in response to differential photoemission levels detected by the probe for determining data related to the dimensions of the geometrical configuration of the display.

The circuitry according to the invention is fully applicable to conventional cathode ray tube displays, although the conventional coordinate data determination systems are quite satisfactory. Such conventional systems are considered accurate to the equivalent of ±one line of a raster scanning display. The circuitry according to the invention is accurate, however, to ±one-half or better of the equivalent of a line of the same raster. Further, however, the circuitry according to the invention is applicable to CRT displays where the characteristics of the apparatus are below the minimum required for conventional coordinate data determination systems, particularly so, for example, where the phosphors are insufficiently excited by the cathode ray beam at the desired scanning speed, such as in long persistance CRT where the decay of the image is slow. The several forms of deformographic storage display tubes are even more dependent of the circuitry according to the invention; in some instances partial erasure of the display is indicated for coordinate data determination.

More particularly, the coordinate data approximation system for a photoemissive matrix display, particularly a cathode ray beam tube display, comprises a cathode ray tube having a cathode ray beam forming electron gun assembly, a target assembly spaced at a distance from the gun assembly, electron beam deflecting components arranged along the tube intermediate to the assemblies for deflecting the electron beam emanating form the gun assembly over the target assembly in a regular geometrical configuration definable in two dimensions, and electron beam modulating circuitry arranged in conjunction with the tube for varying the intensity of the electron beam for displaying information. A photoresponsive probe element is arranged for receiving photoemission emanating from the target assembly and circuitry is connected to the probe element for the detection of a predetermined level of intensity of photoemission. Further circuitry is coupled to the probe element and to the electron beam deflecting component for determining the location of the detected photoemission with respect to the whole of the geometrical configuration of the display. The probe element has a photoemissive aperture stop encompassing a plurality of pixel capable of exhibiting the predetermined level of intensity of photoemission and the location determining circuitry comprises electronic logical circuitry for resolving the location of predetermined photoemissive circuitry substantially at the center of the aperture stop. The location determining circuitry comprises storage circuitry in which the periods of successive scans cross the aperture stop are stored and compared for determining the maximum scan period. This provides an indication of the location of the center of the aperture stop over the display.

In order that all of the advantages of the invention fully obtain, preferred embodiments are described hereinafter, by way of example only, with reference to the accompanying drawing forming a part of the specification and in which.

Figure 6A:
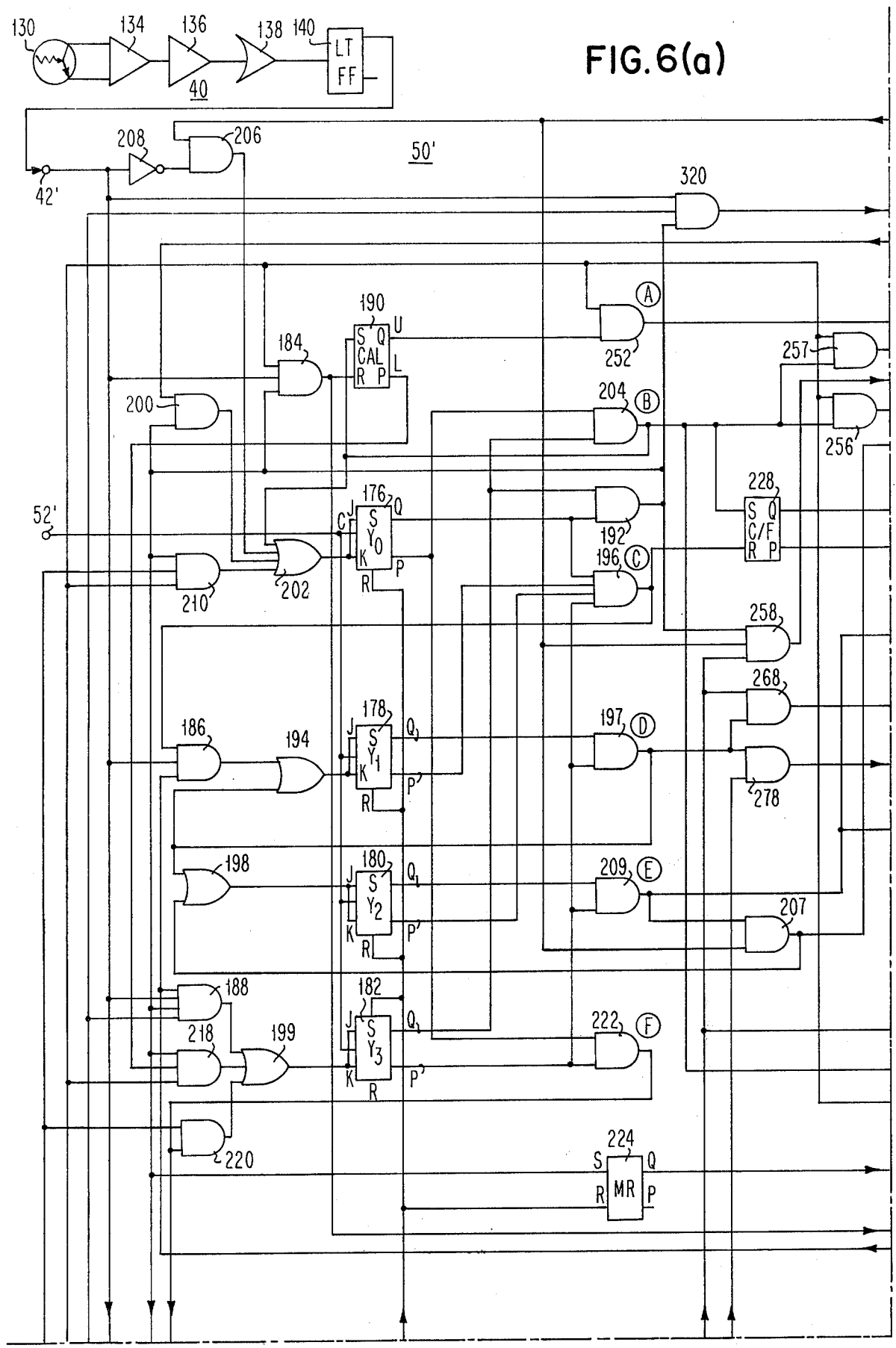
Figure 6B:
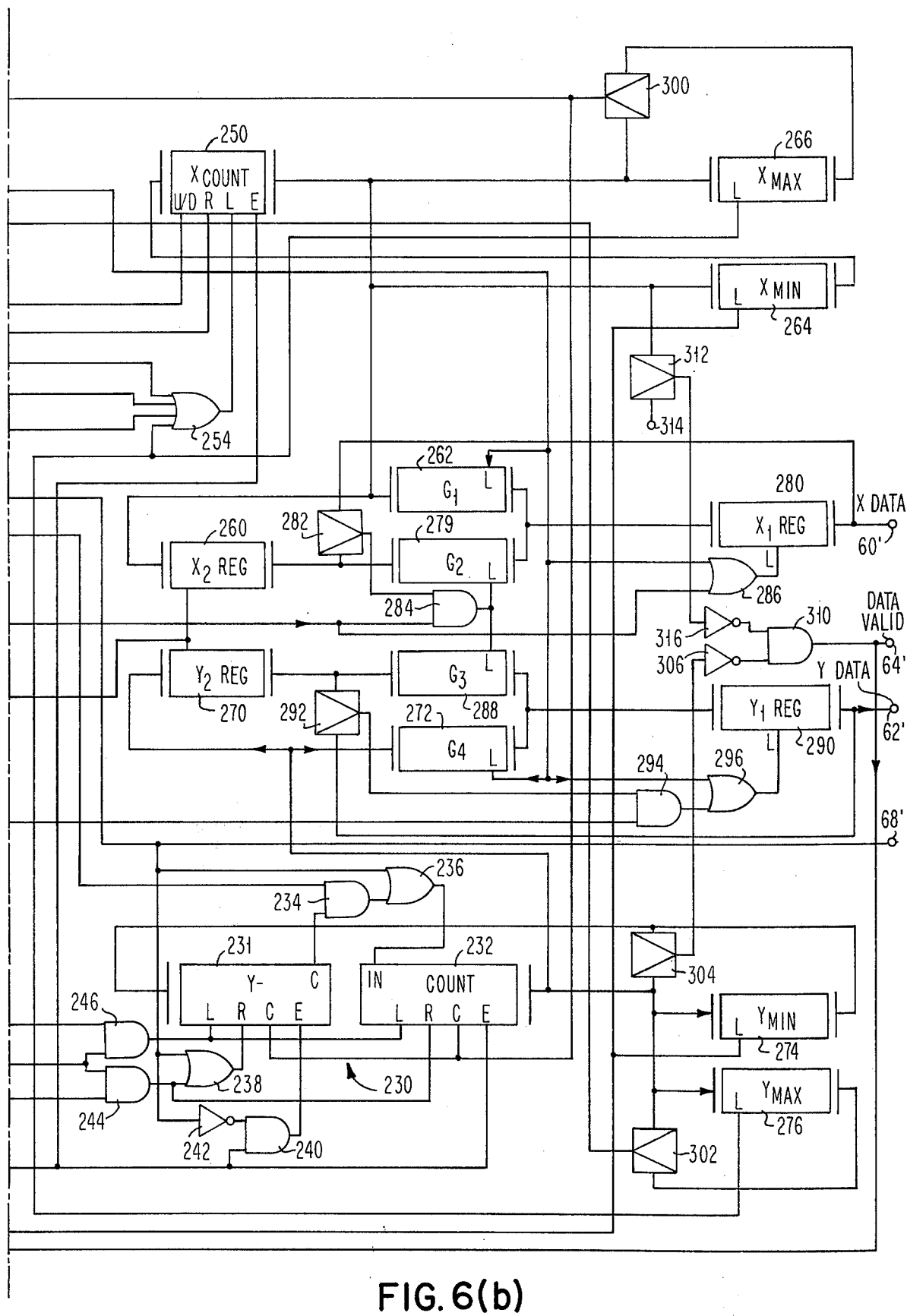
Figure 6C:
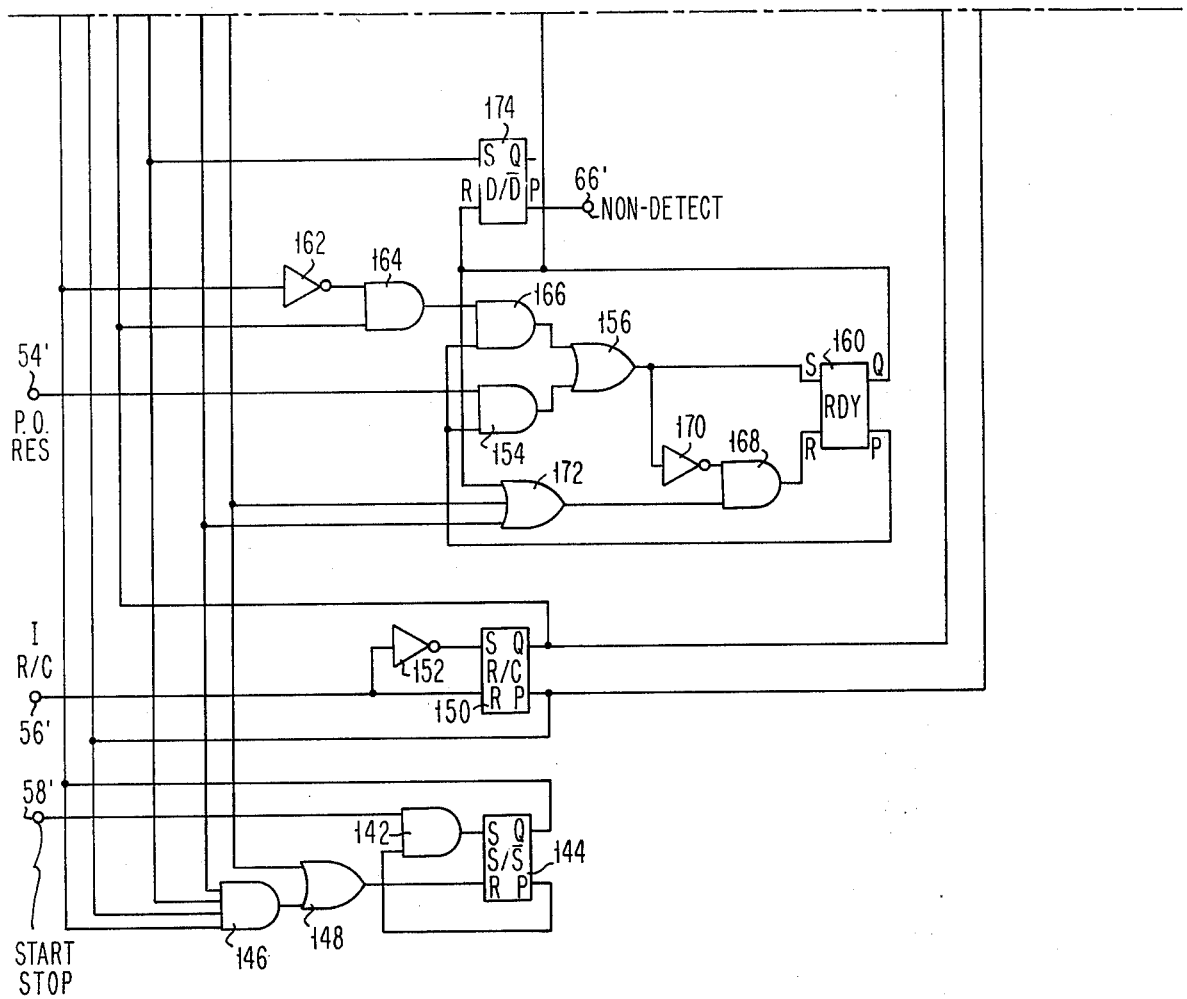
Figure 6:
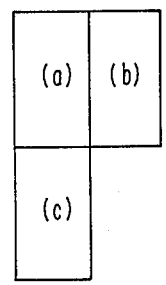
Figure 7:
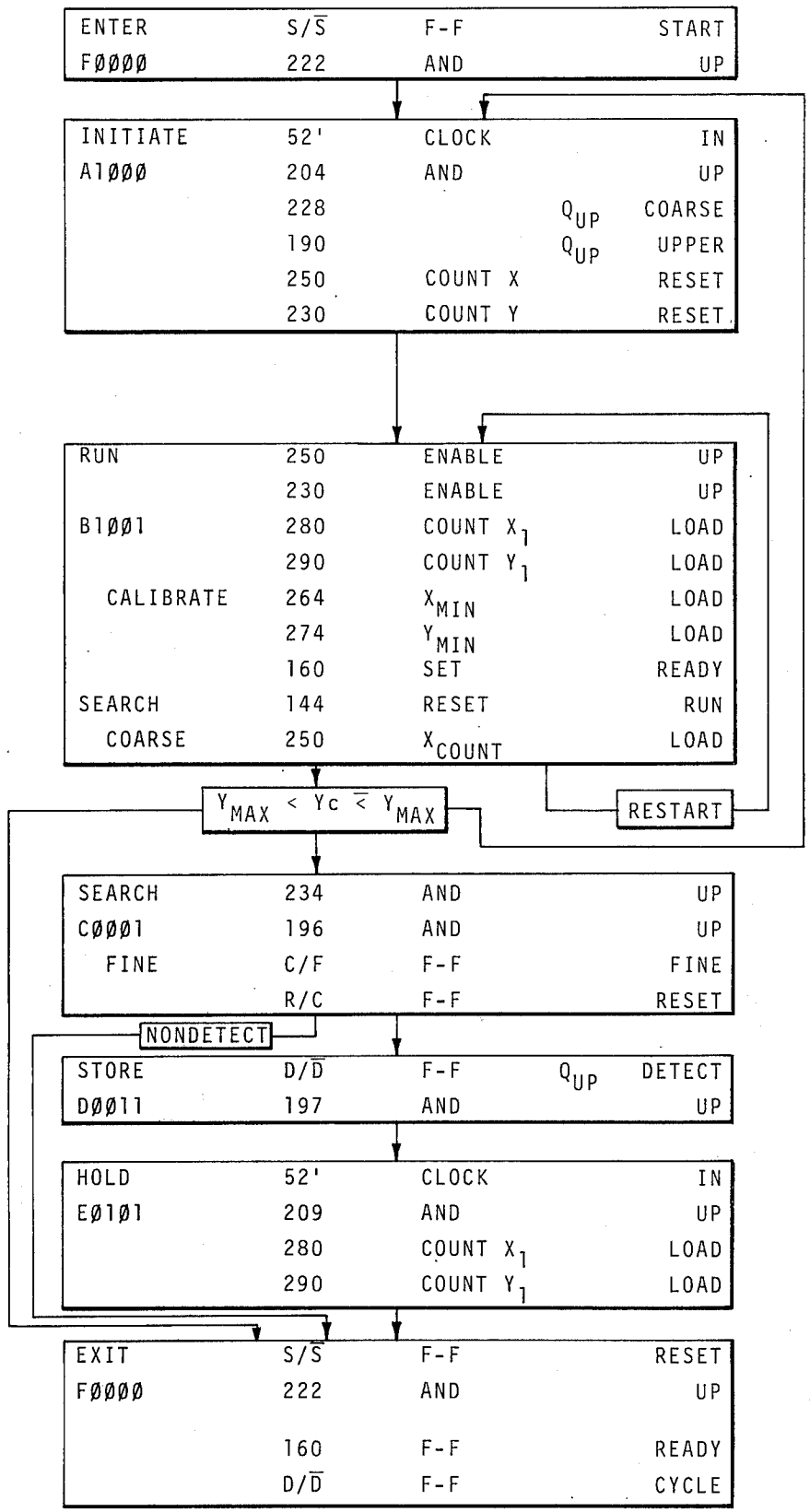

FIG. 6 — sections (*a*), (*b*), and (*c*) being taken together — is a logical diagram of an embodiment of coordinate data approximation circuitry according to the invention; and FIG. 7 is a logical sequence flowchart of operation of the circuitry according to the invention as shown in FIG. 6.

Figure 1:
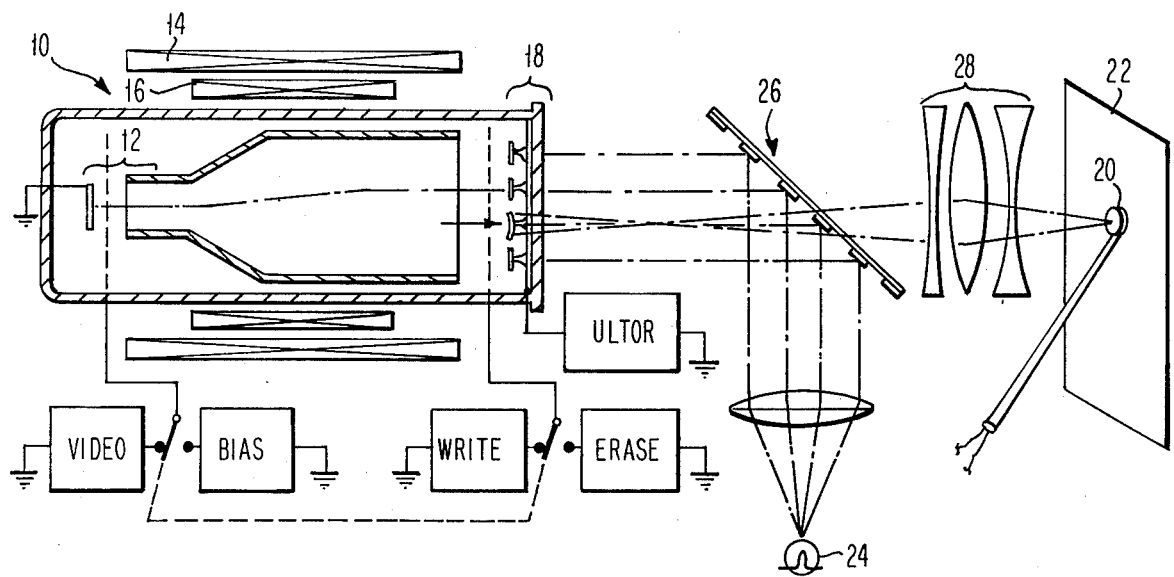
FIG. 1 is a schematic diagram of a mirror matrix display tube and associated apparatus including a probe according to the invention.

A schematic diagram of but one exemplary display system with which the coordinate data approximation system according to the invention is particularly applicable is shown in FIG. 1. A deformable plate display tube (DPDT) 10 has an electron gun assembly 12 for producing a stream of electrons which are focused by means of a coil 14 and deflected by means of another coil 16 into a deflectable electron beam impinging on a target assembly 18. The target assembly 18 as shown here comprises a matrix of tiny, extremely thin cantilever plates spaced from a substrate and supported thereon by means of tiny posts of insulating and/or semiconductor material. This particular type of display, using a mirror matrix valve is described in greater detail in U.S. Pat. No. 3,746,911 to Harvey C. Nathanson and John R. Davis, Jr. The electron beam impinging on the deformable plates sets up a dot matrix deformation pattern in accordance with the information applied in modulating the intensity of the electron beam. The dot matrix pattern may be sensed in theory by a photoresponsive probe at the target where the light values can be distinguished, but this type of display tube is designed for photosensing at a distance by means of a probe 20 placed on an image formed on a screen 22 by means of a schlieren optical projection system. Such systems are conventional and one such system is represented here as comprising a light source 24, a mirror/stop 26 for illuminating the target assembly 18 and an assembly 28 of optical projection lenses. This display is illustrated here because it is one of the more recent developments in the art. A similar system using a schlieren optical projection system is the more conventional deformable layer display tube (DLDT) shown and described in U.S. Pat. Nos. 3,626,084 of Robert James Wohl et al, 3,676,588 of Robert James Wohl et al and 3,858,080 of Robert James Wohl. These two types of tubes make up a class of display tubes known as deformographic storage display tubes (DSDT) requiring schlieren optical projection systems or the equivalent.

Figure 2:
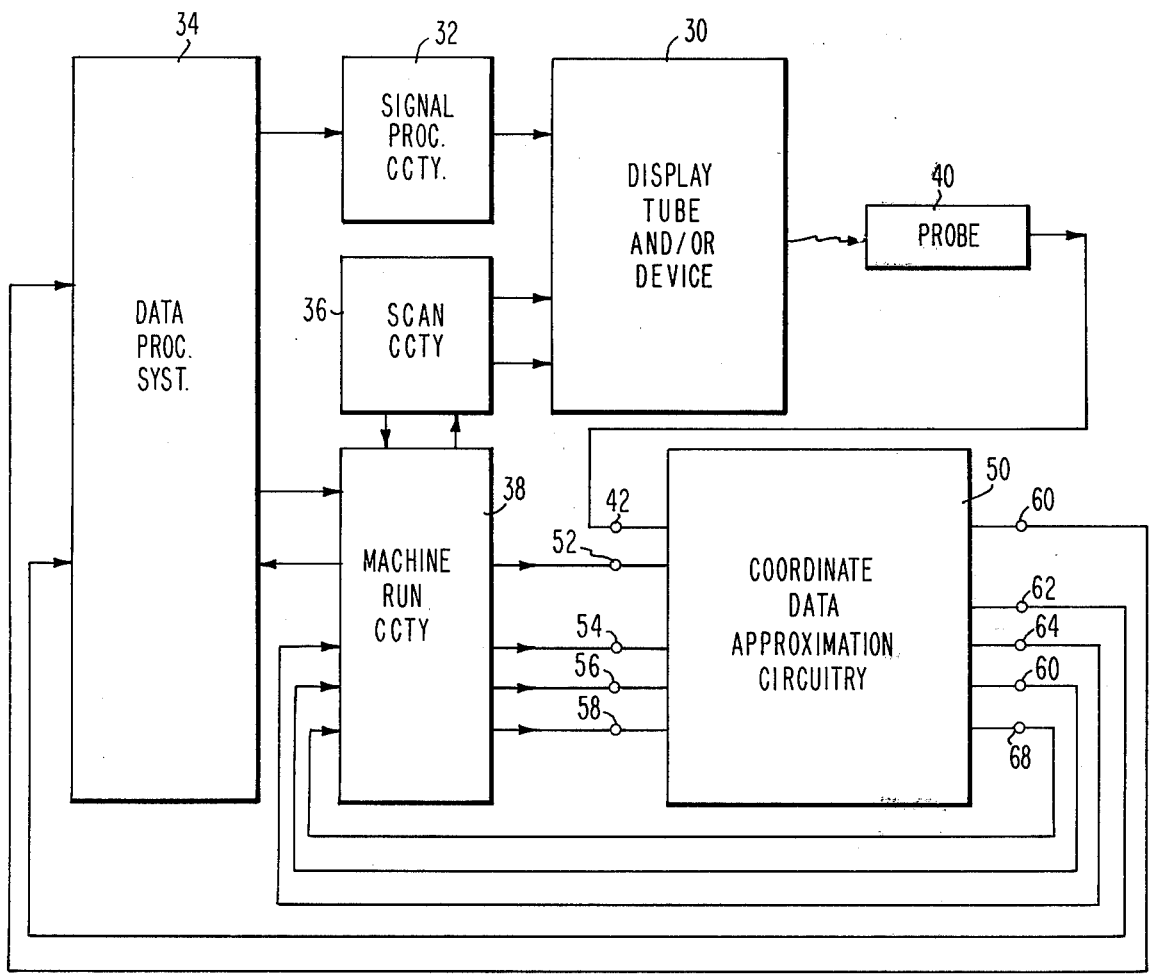
FIG. 2 is a functional diagram of circuitry for operating a display tube and/or device with an approximation coordinate data determining system according to the invention.

A functional diagram of a coordinate data approximation system according to the invention is given in FIG. 2. A display tube and/or device 30 comprises any one of the applicable types of display tube such as either of the DSDT described above. However, the invention is applicable also to other types of photoemissive matrix display tubes (PMDT) or dot matrix display tubes (DMDT). An example of a DMDT is found in British Pat. No. 1,317,663 to T. D. Criscimagna et al for "Method and Apparatus for Gas Display Panel", which describes a panel storage display tube (PSDT). Such a tube, when addressed cell-by-cell or picture-element (pixel)-by-pixel in a regular predetermined order, especially as in an arrangement of a beam switchable display tube (BSDT) forms a basic photoemissive matrix display tube (PMDT) to which the circuitry according to the invention is readily adaptable. Other display tubes more closely related to the DSDT are the electroluminescent display tubes (ELDT). This type of tube encompasses the liquid crystal display tube (LCDT) and the excited phosphor display tube (EPDT) which is most commonly a cathode ray display tube (CRDT), and which is probably the most common CDDT using data coordinate determination systems. Conceivably, a flying spot tube analyzing system may be used with the system according to the invention for determining data very much in the manner that the heretofore mentioned U.S. Pat. No. 3,692,936 is used with respect to non-photoemissive displays such as maps, charts, and the like. Information to be displayed for the tube and/or device 30 is processed by signal processing circuitry 32 under control of a data processing system 34. A predetermined order of controlling the display pixel-by-pixel is under the control of conventional scanning circuitry 36. In most cases, the data processing system 34 is connected to machine running circuitry 38 for synchronizing the scanning circuitry with the displayed data. A probe 40 is responsive to photoemission from the display tube and/or device 30 and applies an electric signal at input terminals 42 of coordinate data approximation circuitry 50 according to the invention. A clock pluse train related to the display scanning waves is delivered by the machine running circuitry 38 to an input terminal 52 of the coordinate data approximation circuitry (CDAC). It should be clearly understood that the basic clock rate of the data processing system 34 is reflected throughout the circuitry of the coordinate data approximation system in a manner normal to such digital data processing systems. Machine running circuitry 38 also supplies other pulse and/or electric level controls, for example, a poweron reset level delivered to an input terminal 54, a run/calibrate level to an input terminal 56, and start/stop control level delivered to an input terminal 58. The CDAC delivers coordinate data at output terminals 60 and 62 for delivery to the data processing system 34. In the majority of applications, x and y data information is delivered at these terminals, however, if polar coordinates are desired, the CDAC is arranged to deliver $\rho, \theta$ data at these terminals, and so forth. Other informative data is frequently desired for operating the system. For example, a voltage level indicating that the data on terminals 60 and 62 is valid is delivered at an output terminal 64 along with an indication that the CDAC is or is not in a non-detect mode delivered at an input terminal 66 and that it is in a coarse or fine mode delivered at an output terminal 68. These output terminals 64, 66 and 68 usually are connected to the machine running circuitry 38 as shown. Other interconnections for similar purposes will be suggested to those skilled in the art as the case at hand requires.

From this point on, the description will be confined to a discussion of an application of circuitry according to the invention to a DSDT or a CRDT. These are of either the projection type or the direct viewing type. Those skilled in the art will readily adapt the circuitry to other types of PMDT.

Returning to FIG. 1, the deformographic storage display system shown having a DPDT operates much like a system having the older DLDT of the reflective type. Light from the source 24 is focussed on the reflective surface of the target assembly 18. The light reflected from the target assembly with no information thereon is refocussed on the screen 22 by means of the schlieren optical system. The display screen 22 will remain unlighted in this condition because all light directed toward the screen is intercepted by the baffle strips of the mirror stop 26. When the electron gun is used to deposit charge between the insulating side of the target and the metal plates, the electrostatic force deflects the plates just as it compresses the flexible deformographic material layer in the DLDT. The DPDT has the advantage that the plates may be deflected in both directions (toward and away from) the substrate, whereas the DSDT layer is decompressible more in theory than in practice. The resulting local deflection or depression, causes light to be reflected away from the baffles to the display screen 22. The reflected light remains as long as the deflection, or the depression, remains. The electron beam is modulated in conventional fashion for forming an image by the deflected plates, or by the deformed areas of the layer. The image remains as long as the insulating surface can maintain the charge that causes the deflection or the depression. Since the charge is readily maintained for periods as long as one-half hour in present day tubes, the image formed by the charge pattern is considered "permanently" stored. The display system is consequently considered a storage display system.

Charge on the insulating side of the DLDT target is usually removed by an electron erase gun. The erase gun generates a flood of low energy electrons that cause secondary emission of the charge previously deposited by the write potentials and the electron gun. When the deposited charge is removed, all depressions are restored by the mechanical forces in the flexible deformographic material. With the mirror matrix tube, the charge is usually erased by changing the bias on the modulating grid to a large negative value. In the absence of depressions in the layer or deflections of the plates, all light focused on the target is again directed to the baffles instead of the display screen 22.

The modes of operation of a deformographic storage display system are based upon the alternation of erase and write cycles. The storage mode of operation is the condition in which an image is allowed to remain on the target and, therefore, on the display screen until it substantially completely fades. An image fades as deposited charge leaks off through the insulation of the target assembly 18. The variable persistence mode consists of alternately writing with a write gun and erasing with an erase gun or the equivalent as shown at a constant rate. The selective erase mode is accomplished by operating the write gun at the write potentials selectively for depositing charge and removing charges selectively. The write potential causes charges to be deposited because the electrons contain such a high terminal velocity from the write potential that they arrive at the target 18 without secondary emission from the target. The net charge is consequently greater than the initial state. Further, since the write gun is addressable, the charge is deposited selectively. The same addressing capability is used when the write gun is operated at the erase potential. However, the electrons that are directed to a point on the target 18 by the erase potential arrive with such a low energy that they cause secondary emission of charge and the selected point is in effect erased.

The iterative approximation technique embodied in the circuitry according to the invention is arranged for accommodating the slow writing speed of the DSDT and for increasing the accuracy of the detection.

Figure 3:
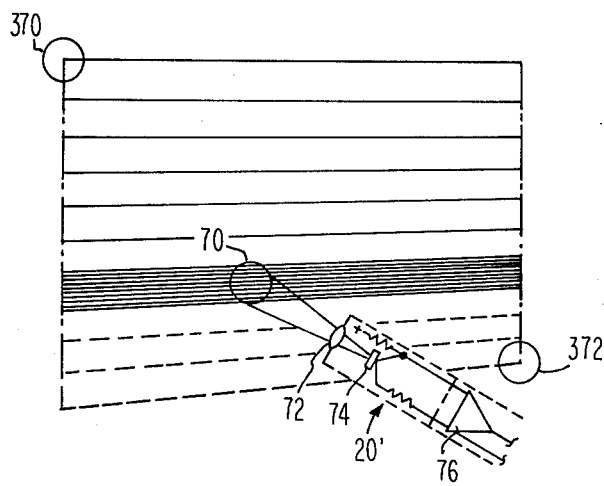
FIG. 3 is a diagram illustrating certain aspects of the apparatus according to the invention.

The speed modification is centered about a two-phase scan of the raster pattern. The accuracy modification is based on differentiating the output of the photoresponsive probe 40 to generate a pulse train that corresponds in time to successive raster lines beneath the photoresponsive probe 20. The first phase of the modified raster scan consists of skipping lines so that only every nth line of the raster field is refreshed or written prior to the first detection. The number $n$ must be equal to or less than the diameter of the aperture stop measured in scanning line widths. Other considerations are discussed later. The second phase of the detection consists of refreshing or writing every line of the raster field to allow for fine detection of photoresponsive probe responses. A typical scan sequence showing the pattern generated by the two-phase scan appears in FIG. 3. Note that the coarse scan ends and the fine scan begins after the first coarse detection which detection is used to trigger the circuitry for making the change. It is unnecessary therefore to scan the entire display once for the coarse scanning phase and once again for the fine scan. When the light probe 20 is placed against the display screen 22 to detect, only a portion of the display provides light to the probe 20. The region is normally circular and is referred to as the subtended aperture circle. A circle 70 represents the optical aperture of the probe 20'. As shown here, the probe comprises a more or less conventional barrel which can be held in the hand and which contains a lens 72 at the nose. Light from the aperture circle 70 is focused by the lens 72 onto a photosensitive device 74, for example a phototransistor. The current generated by the device 74 is applied to a pre-amplifying circuit 76 from which an output current is delivered to circuitry described hereinafter. This probe 20' is a type that is used with CRT and like diveic displays which are "lighted from the rear". For projection and like displays which are "lighted from the front", the probe preferably is shaped more like a distorted frying pan and the photosensitive aperture intercepts the light from the projecting device. The front surface of this probe preferably made to appear as though it were a part of the overall screen onto which the light image is projected.

Figure 4:
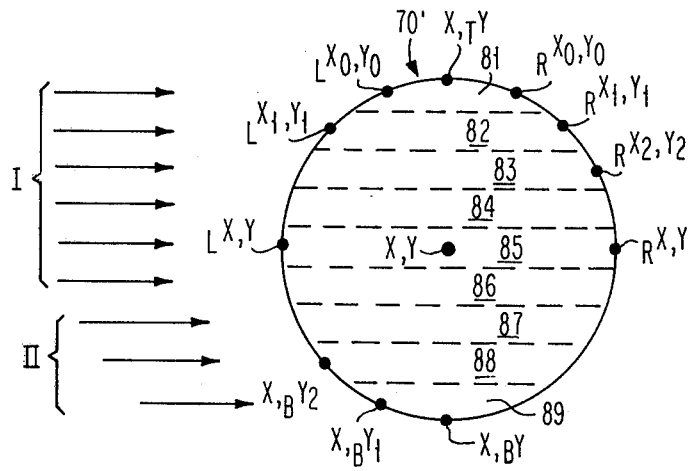
FIG. 4 is another diagram illustrating other aspects of the invention.

Another schematic diagram, FIG. 4, represents a magnified optical aperture by a circle 70'. Nine horizontal scanning lines 81–89 are shown as intercepted by the probe. Each "line" as shown here occupies the entire space between dashed lines as in a non-interlaced CRT display for maximum resolution, that is smallest beam and the closest together. The first scanning line 81 is shown as almost completely intercepted. A detect signal will result. Ideally one coordinate, the $x$ coordinate, is determined, but actually sufficient excitation may not exist before the center of the segment of line 81 is reached so that any such determination is questionable if not erroneous. According to the invention, the number of digital (spot-size) increments in the x-direction are stored in a counter and likewise a number equal to or an equivalent of the Y coordinate of this first detected line is stored in another counter. The scanning mode is changed from coarse to fine on this detect signal, whereby the process is repeated on the very next scan. It should be understood that an interlaced display is fully subject to the invention as those skilled in the art will readily understand that the next scan in the same field is then to be considered. The invention is, however, described for the non-interlaced system in the interest of clarity. At the end of the segment of line 82 intercepted by the probe the numbers stored in the registers are shifted to succeeding registers and the numbers corresponding to the line 82 are stored in place of the earlier numbers. The numbers of the (spot-size) increments or pixel in the horizontal direction are compared to determine if a maximum number has been stored. If not the same process is repeated for the next scan. For the example shown, the comparison made at the end of the segment of line 86 intercepted will indicate (by a negative difference in count) that the line 86 is the locus of a maximum segment in the X or horizontal direction. Thus line 85 lies on the diameter of the aperture circle 70' and defines the Y coordinate sought. In most applications, the number of the line of the raster scan is the one used as the lines (whether non-interlaced or interlaced) are the increments of the display in the Y or vertical direction.

It is contemplated that in one embodiment of the invention the count in the X direction be used to determine the control (spot-size) element or pixel by adding to the number of pixel defining clock-pulses from the left edge of the raster to the intercept aperture circle 70' a number equal to half the difference in numbers from the left to the right of the aperture circle 70'. In such an embodiment a counter is arranged to store this difference in numbers and a gate is arranged to left shift the counter for readout on the negative response of the comparator at the end of the segment 86.

A more rigorous analysis of the foregoing is in order.

The end points of the horizontal diameter of this circle will be referred to as "left $x$ and $y$" and as "right $x$ and $y$". These points are denoted by $(_Lx,y)$, $(_Rx,y)$. The end point of the vertical diameter of the subtended circle will be referred to as "$x$ and upper $y$" and as "$x$ and lower $y$". The end points of the vertical diameter of the subtended circle will be denoted by $(_Lx,_Ty)$ and by $(_Lx,_By)$. The same conventions will be applied to any other horizontal chord or vertical chord of the subtended circle. The rotation in FIG. 4, makes these conventions clear.

If the circle subtended by the light aperture is k lines in diameter and the number of lines shipped in scanning the display is n, the following cases are possible:

a. $k<n$; no detect may occur in some cases where a valid detect should occur
b. $k=n$; no detect may occur in some cases where a valid detect should occur
c. $k>n+3$; at least three detects will occur.
d. $k>n+k/2+1$; at least one detect will occur in the upper half of the subtended circle.

Cases (a) and (b) are discarded as unacceptable. Case (c) defines the minimum requirements for the algebraic detection process that requires multiplication and division in the data processing system receiving the coordinates. Case (d) defines the requirements for the successive approximation approach.

The algebraic technique is based upon the fact that three points are sufficient to determine a circle and that the detection process can yield distinct points on the perimeter of the subtended circle. The method consists of coarse (line skipping) raster scan before the first light probe detection occurs. The coordinates of the initial detection are saved and a fine scan is made to collect two additional sets of coordinates. These coordinates are sent to the data processing system where the center of the circle is found by solving a set of linear equations.

The successive approximation technique consists of recording the coordinates of successive intersections of scanned raster lines and the circle subtended by the light probe aperture stop. If the first line scanned through the circle intersects in the upper half-circle, subsequent intersections will converge to the horizontal diameter of the subtended circle. Two sets of coordinates must be stored for comparison purposes. The old estimate must be stored and the new estimate must be stored. If the new estimate is closer to the horizontal diameter than the old, the old is replaced by the new estimate; otherwise, the detection terminates. The closeness to the diameter is measured by comparing the relative magnitudes of successive $_Lx$ coordinates. If $_Lx_{i+1}>_Lx_i$, the current estimate of the intersection of the left end of the horizontal diameter and the subtended circle is $(_Lx_{1+1},y_{i+1})$. If $_Lx_{i+1}=_Lx_i$, the horizontal diameter of the subtended circle lies halfway between the raster lines with address $Y_i$ and $Y_{i+1}$. If $_Lx_{i+1}>_Lx_i$, the previous estimate of the intersection of the left end of the horizontal diameter and the circle subtended by the light probe aperture stop is correct.

When the horizontal diameter is determined, the vertical diameter can be located by two methods. First, if the host data processing system is given the radius of the aperture circle, the light probe detection circuitry need only supply $(_Lx_e, y_e)$, the current left end estimate of the horizontal diameter with a line to indicate whether the true diameter is addressable. The constant radius of the aperture circle 70' can be added to the X-coordinate of the estimate in the host data processing system. If the host system is not given the radius of the subtended circle, the radius can be calculated in the detection circuitry. The difference $\Delta x$ can then be given to the host system for addition of the base increment. The estimate is subsequently $(X_e+\Delta X, Y_e)$. Ultimately, the entire calculation can take place in the detection circuitry and the host system would receive a single data set $(Xe,Ye)$ from the detection system which represents the center of the subtended aperture circle.

A third means for finding the x-coordinate of the vertical diameter (which is the x-coordinate of the center of the aperture circle) is to use the method of successive approximations on vertical chords of the subtended circle after the y-coordinate has been found. Vertical chords converge to the vertical diameter in exactly the same way that horizontal chords converge to the horizontal diameter. For the top-to-bottom scan pattern (that has been assumed) the test coordinate would be $_BY$; that is, lower or bottom Y. That is to say, successive values of $_bY_i$ and $_BY_{i+1}$ are compared to determine which estimate of the vertical diameter is most accurate. Once the vertical diameter is found, its $x$ coordinate is used as the estimate of the $x$ coordinate of the center of the aperture circle. The estimate is as accurate for the $x$ coordinate as it is for the $y$ coordinate. The branch condition for converging to the vertical diameter is that either detection has occurred and the corresponding $_bY_{i+1} > _bY_i$ or that a raster line has been scanned and no detection occurred.

The latter criteria is based on counting the scanning lines down from the top of the raster. Because graphical data is so conventionally shown with zero or base reference at the bottom of the raster, the y coordinate counter is alternately loaded with a Y maximum count and counted down. In this case $_bY_{i+1} < _bY_i$ as will be readily seen by those skilled in the art.

Successive light probe detects must be recorded. Due to the storage of the writing medium, successive lines cause the level detected by the light pen to become increasingly higher. However, the changes in light level are sychronized with the succession of raster lines. Consequently, each change in light level at the light probe aperture stop occurs at the time the corresponding raster line reaches the circle subtended by the light probe. The coordinates of the counters can be sampled at these times to determine the location of the edge of the circle subtended by the light and the instant raster line. Both edges can be detected if the start of the light level change is used as a trigger and if the end of the light level change is used as a trigger.

Figure 5:
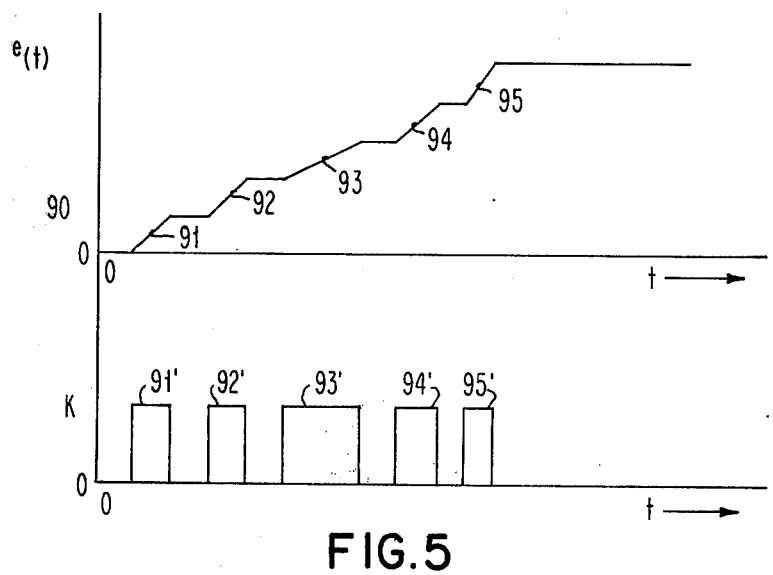
FIG. 5 is a graphical representation of electric waveforms useful in an understanding of the invention.

The output $e(t)$ of the light probe 40 is approximately and ideally represented by a curve 90 in FIG. 5 comprising sloped segments 91, 92 . . . 95 alternating with level segments. The first derivative of $e(t)$ is shown as $e'(t)$. The pulses 91' . . . 95' in $e'(t)$ are used to indicate the light pen detections. The levels shown here are due to storage, without which the leading edge of each pulse indicates the time of intersection of a raster line and the left edge of the subtended aperture circle. The trailing edge of each pulse indicates the time of intersection of a raster line and the right edge of the subtended circle. The actual waveforms will differ from those in the figure in that the pulses and ramps will be of varying lengths. The differentiator is a conventional circuit.

Circuit components of a probe 40' are shown in FIG. 6a. A photoresponsive transistor 130 or like device is connected to a differential amplifier 134 and a succeeding amplifier 136 followed by a differentiating circuit 138 and a level triggering flip-flop circuit 140, for example, a Schmitt trigger circuit. The output line of the flip-flop circuit 140 is connected, normally by a length of transmission line, to probe input terminals 42' of a CDAD 50'. Essentially, the photoresponsive transistor 130 responds to the light emitted from the several scans of pixel in the aperture. For a conventional CRT display, the change in light level as the display is refreshed is indicative of the scanning or clocking pulse count. For a deformographic display tube and like, displays having substantially no decay, the equivalent of a refresh scan is obtained by first erasing (induced decay) or, preferably, partially erasing and rescanning where that is feasible.

Some gas panel tube displays have sufficient decay that the probe is effective with merely a more highly sensitive amplifying channel. Such amplifying circuitry is entirely conventional and compact and inexpensive as well. Gas panel displays with grey level pixel do not require refreshing. The size of the probe aperture is readily tailored to the size of the screen or faceplate. Compatible arrangements are readily designed by one skilled in the art. The circuitry according to the invention is of some considerable importance for use with the quite conventional CRT display system. It serves to overcome lighting, decaying, and darkening problems in characteristics of present day phosphors as the resolution of the system is increased.

A clock pulse train is applied at clock pulse input terminals 52'. The clocking is conventional data processing clocking. In the interest of clarity, the logical circuitry is described as though the clocking pulse train is inactive during flyback times and the like or as though the display apparatus is free of such, as is the case with some PSDT display systems. Those clock pulses appearing during flyback, retrace, and the like, are in effect, excluded from the data, depending of course, upon the system which the designer chooses to implement. In spiral scanning and in serpentine scanning arrangements such as are used with panel storage display tube systems, clock pulses are continuously applied during one complete cycle; here flyback time is not of any consequence. Those skilled in the art readily will accommodate for such interrupting characteristics of the systems at hand in accordance with conventional practice. Other conventional electric control levels are applied at input terminals 54', 56' and 58' as shown (FIG. 6c). These terminals accept power on bistatic reset levels, run/calibrate levels, and a start/stop levels respectively. The start/stop terminal 58' is connected to an AND gating circuit 142 for setting a bilateral start/stop (S/S) flip-flop circuit 144. The latter is reset by way of another AND gating circuit 146 and an OR gating circuit 148 as will be detailed hereinafter. The run calibrate terminal 56' is connected to the reset terminal of another bilateral R/C flip-flop circuit 150 and by way of an inverting circuit 152 to the set terminal of the latter flip-flop circuit. The power on reset terminal 54' is connected to an AND gating circuit 154 leading through an OR gating circuit 156 to a bilateral ready flip-flop circuit 160. The start line from the start/stop flip-flop circuit 144 is applied to an inverting circuit 162 and through an AND gating circuit 164 to which run level from the flip-flop circuit 150 is applied. The output of the AND gating circuit 164 is applied through another AND gating circuit 166 through the OR gating circuit 156 to the set terminal of the flip-flop circuit 160. The initial state of readiness is now indicated. The reset terminal of the latter is connected to an AND gating circuit 168 which has one lead connected back to the OR gating circuit 156 by way of an inverting circuit 170 and another lead connected to an OR gating circuit 172 to which the output of the flip-flop circuit 160 is applied. At the same time, this output lead from the flip-flop circuit 160 is connected to reset terminals of a data detect/detect flip-flop circuit 174, the P output terminal of which is connected to the non-detect output terminal 66'. Hereinafter, the P terminal of any flip-flop circuit corresponds to the Q terminal, or complementary output terminal, as such terminal is more frequently termed.

Clock pulse train input terminal 52' (FIG. 6a) is connected to the clock input terminals of four JK flip-flop circuits 176, 178, 180 and 182 which serve as state registers among other functions. The output of the ready flip-flop circuit 160 is connected to the reset terminals of the JK flip-flops 176, 178 and 180 and to the set terminal of the JK flip-flop circuit 182. These JK flip-flop circuits step the circuitry through setting up for determination, searching rapidly, searching minutely, recording the location of a detect, and saving the detected information for resolution for an element determination and thereafter exiting for resetting the logical circuit arrangement for the next determination. The probe input terminals 42' are connected to a three-way AND gating circuit 184, another three-way AND gating circuit 186, a four-way AND gating circuit 188, the set terminal of the flip-flop circuit 174 and the four-way AND gating circuit 146. The complementary P terminal of the run/calibrate (R/C) flip-flop circuit 150 is connected to one lead of the AND gating circuit 184 for resetting an upper/lower calibrating (CAL) flip-flop circuit 190 when the other lead of the AND gating circuit 184 is at the up level as determined by another AND gating circuit 192 having input leads connected to the output terminal of the JK flip-flop circuits 176 and 182. The AND gating circuit 186 is connected through an OR gating circuit 194 to the J and K terminals of the JK flip-flop circuit 178. This AND gating circuit has one lead connected to the valid output terminal 64' (FIG. 6b) and another lead connected to a four-way AND gating circuit 196 (FIG. 6a) which has one lead connected to the output lead of the JK flip-flop circuit 176, a second lead connected to the complementary P output terminal of the JK flip-flop circuit 178, a third lead connected to the complementary P output terminal of the JK flip-flop circuit 180 and a fourth lead connected to the complementary P output terminal of the JK flip-flop circuit 182. The AND gating circuit 188 is connected through another OR gating circuit 198 to the J and K terminals of the JK flip-flop circuit 182. This AND gating circuit is also connected to the valid output terminals 64' to the output of the AND gating circuit 192 and to the output Q terminal of the R/C flip-flop circuit 150.

The output of the AND gating circuit 192 is also connected to one lead of a two-way AND gating circuit 200 having an output line passing through an OR gating circuit 202 to the J and K terminals of the JK flip-flop circuit 176. The other lead of the AND gating circuit 200 is connected to a line on which an electric level representing Y-overflow is established due to overflow of a counter later to be described. The OR gating circuit 202 also has a lead from the output terminal of another AND gating circuit 204 having one input lead connected to the complementary P terminal of the JK flip-flop circuit 176 and another lead connected to the Q output terminal of the JK flip-flop circuit 182. The set terminal of the CAL u/l flip-flop circuit 190 is also connected to the output terminal of the AND gating circuit 204. Another input lead of the OR gating circuit 202 is connected to a further AND gating circuit 206 having an input lead connected through an inverting circuit 208 to the detect input terminals 42' and another input lead connected to a line having an electric level thereon representing X-overflow from another counter later to be described. The final input lead of the OR gating circuit 202 is connected to a three-way AND gating circuit 210 having input leads connected to the start terminal S/$\overline{\text{S}}$ flip-flop circuit 144 (FIG. 6c), to the calibrate terminal of the R/C flip-flop circuit 150, and the AND gating circuit 192 (FIG. 6a). An AND gating circuit 197 has one input terminal connected to the Q output terminal of the JK flip-flop circuit 178 and another input circuit connected to the complementary P output terminal of the JK flip-flop circuit 182. The output of this AND gating circuit 197 is then applied to the OR gating circuit 194 and another OR gating circuit 198, having an output terminal connected to the J and K terminals of the flip-flop circuit 180. Another input lead of the OR gating circuit 198 is connected to the output terminal of an AND gating circuit 207 having one input line connected to the previously mentioned X-overflow line and another input lead connected to a further AND gating circuit 209. The Q output line of the JK flip-flop circuit 180 is connected to the AND gating circuit 209 while the other input lead of this AND gating circuit is connected to the complementary P output terminal of the JK flip-flop circuit 182. The OR gating circuit 198 has one input lead connected to an AND gating circuit 218 and another AND gating circuit 220. The former AND gating circuit 218 has one lead connected to the calibrate terminal of the R/C flip-flop circuit 150, another lead connected to the AND gating circuit 192, and a further lead connected to the complementary P output terminal of the bilateral flip-flop circuit 190. The AND gating circuit 220 has one lead connected to the start output terminal Q of the S/$\overline{\text{S}}$ flip-flop circuit 144 and another lead connected to a further AND gating circuit 222, the input leads of which are connected to the complementary P terminal of the JK flip-flop circuit 182 and the complementary P output terminal of JK flip-flop circuit 176. The output terminal of the AND gating circuit 192 also is connected to an input lead of the OR gating circuit 172 and the AND gating circuit 146, while the output of the AND gating circuit 222 is connected to the OR gating circuit 172 and the OR gating circuit 148 previously mentioned. Machine Running (MR) bilateral flip-flop circuit 224 has a set terminal connected to the output of the AND gating circuit 192 and a reset terminal connected to the Q output terminal of the flip-flop circuit 160. The output Q terminal and the complementary output P terminal of the flip-flop circuit 224 are applied to counting circuitry as will be described hereinafter.

The output of AND gating circuit 204 is connected to the set terminal of an C/F bilateral flip-flop circuit 228 having the reset terminal connected to the output of the AND gating circuit 196. This flip-flop circuit pegs the process in coarse or fine search as will be described hereinafter. A Y counter 230 (FIG. 6b) is divided into two sections 231 and 232. Section 231 has count input, load, reset, clock, enable and carry output terminals, while section 232 has carry input load, reset, clock, enable and count output terminals. The carry output terminals of section 231 are connected to an AND gating circuit 234, having another input lead connected to the complementary P terminal of the coarse/fine flip-flop circuit 228. The output circuit of the AND gating circuit 234 is connected through an OR gating circuit 236 to the carry input terminal of section 232. Thus, when the C/F flip-flop circuit 228 is in the condition for search fine, sections 231 and 232 of the Y counter 230 are connected in cascade as one single counting circuit. The coarse Q output terminal of the C/F flip-flop circuit 228 is connected to another input lead of the OR gating circuit 236 and to another OR gating circuit 238 connected to the reset terminal of section 231 of the Y counter 230 and to another AND gating circuit 240 by way of an inverting circuit 242. Another input lead of the gating circuit 240 is connected to the Q ouput terminal of the MR flip-flop circuit 224 and the output circuit is connected to the enable terminal of the section 231 of the Y counter 230. Another input lead of the OR gating circuit 238 is connected to an AND gating circuit 244 having the output lead thereof also connected to the reset terminal of section 232 of the Y count circuit. One input terminal of the AND gating circuit 244 is connected to the run/calibrate flip-flop circuit 150 complementary P output terminal. This AND gating circuit is active in the calibrating mode. The other Q output terminal of the R/C flip-flop circuit 150 is connected to the input of another AND gating circuit 246 having the output thereof connected to the load terminals of both sections of the Y counter 230. Both AND gating circuits 244 and 246 are armed by a common connection to the AND gating circuit 204. The enable terminal of section 232 and the input terminal of AND gating circuit 240 which is connected to the enable terminal of section 231 of the Y counter 230 is connected to the output Q terminal of the MR flip-flop circuit 224. An X counter 250 has count input and output terminals, and reset, up/down (U/D) input, load and enable terminals. The U/D control terminal is connected to an AND gating circuit 252 having one input terminal connected to the output Q terminal of the $u/1$ CAL flip-flop circuit 190 and another input terminal connected to the complementary P terminal of the run/calibrate flip-flop circuit 150. The load terminal of the X counter 250 is connected to an OR gating circuit 254 having four input leads, one of which is connected to an AND gating circuit 256 having one input lead connected to the complementary P terminal of the R/C flip-flop circuit 150 and the other lead connected to the AND gating circuit 204. A reset AND gating circuit 257 is connected to the reset terminal of the counter circuit 250, while one input lead is connected to P or calibrate terminal of the R/C flip-flop circuit 150 and the other input lead is connected to the AND gating circuit 204. Another input lead of the OR gating circuit 254 is connected to an AND gating circuit 258 having one input lead to the AND gating circuit 192, another input lead to the X-overflow line and a third input lead connected to the output Q terminal of the R/C flip-flop circuit 150. The enable input lead of the X counter 250 is connected to the output Q terminal of the MR flip-flop circuit 224. Another input lead of the OR gating circuit 254 is connected to the output of an AND gating circuit 207 while the remaining input leads of the OR gating circuit 254 is connected to the output of the AND gating circuit 209.

The counting output of the X counting circuit 250 is applied to the input counting terminals of an $X_2$ register 260, to a $G_1$ gating register 262 to an $X_{minimum}$ register 264 and to an $X_{max}$ register 266. The loading terminal of the $X_2 2$ register is connected to an AND gating circuit 268 having one input lead connected to AND gating circuit 196 and the other lead connected to the run output Q terminal of the R/C flip-flop circuit 150. In much the same manner, the output of the Y counting circuit 230 is applied to a $Y_2$ register 270, a gating register $G_4$ 272, a register 274 and a $Y_{maximum}$ register 276. The $Y_2$ register is also loaded by a connection to the AND gate 268. The $X_{max}$ register 266 and the $Y_{max}$ register 277 have the load terminals connected in common to an AND gating circuit 278, one terminal of which is connected to the AND gating circuit 196 and the other input terminal of which is connected to the complementary P output terminal of the run/calibrate flip-flop circuit 150. The $X_{minimum}$ register 264 and the $Y_{min}$ register 274 have the load terminals connected to the output Q terminal of the MR flip-flop 224. The count output terminal of the $X_2$ register is connected to another $G_2$ gating register 279, the output of which is connected in common with the output of the $G_1$ gating register 262 through the X output register 280. The data in the X output register 280 is connected to the X data output terminal 60' and to a detector circuit 282 having another input terminal connected to the $X_2$ register 260. The output of the detector circuit 282 is connected to an AND gating circuit 284 along with a lead from the AND gating circuit 208. The AND gating circuit 284 is connected to the load input terminals of the $G_2$ gating register circuit 279 and a similar $G_3$ gating circuit 288. The input of the $G_3$ gating register 288 is connected to the output of the $Y_2$ register 270. The output of the gating register 288 and the other gating register 272 are connected in common to the input terminals of a Y output register 290. An OR circuit 286 has the output connected to the load terminal of the X output register 280 and one input lead connected to the AND gating circuit 209. The output of the Y output register is connected to the Y output terminal 62' and also to a comparator circuit 292 having another input terminal connected to the output of the $Y_2$ register 270. The output of the comparator circuit 292 is then applied to an AND gating circuit 294 having another input lead connected to the AND gating circuit 209 and the resultant electric level is applied through an OR gating circuit 296 to the load terminals of the Y output register 290. A comparator circuit 300 is connected between the input and output terminals of the $X_{max}$ register 266. The output line of the comparator circuit 300 is connected to the AND gating circuit 207 and other circuits as previously described. The overflow line is also connected to the clock terminals of the sections 231 and 232 of the Y counting circuit 230. A similar comparator circuit is connected across the input and output terminals of the $Y_{max}$ register 276. The output of this comparator circuit 302 applies a level to the Y overflow line which is connected to the AND gating circuit 200 as previously described. A similar comparator circuit 304 compares the input from the Y counter 230 and the output of the $Y_{minimum}$ register 274. The output of the comparator 304 is applied through an inverting circuit 306 to an AND gating circuit 310. A similar comparator circuit is connected to the output of the X counting circuit 250 and to a point of zero reference potential at a terminal 314. The output of this comparator circuit 312 is connected to an inverter circuit 316 to the AND gating circuit 310, the output of which is connected to the valid data output indication terminal 64'. The final logic circuit comprises an AND gating circuit 320 having one input terminal connected to the gating circuit 192, another input terminal connected to the output Q terminal of the R/C flip-flop circuit 150 and a third input terminal connected to the load input terminal 42'. The output of the AND gating circuit 320 is applied to the load terminal of the $G_1$ gating register 262, the load terminal of the X output register 280 by way of the OR gating circuit 286, a loading terminal of the $G_4$ gating register 272 and the loading terminal of the Y output register 290 by way of the OR gating circuit 296.

In operation, the circuitry described is automatic in most respects as far as a human operator is concerned. The steps for determining the first, X, coordinate is illustrated by a "flowchart" set forth in FIG. 7. Data processor controlling software and logical circuitry as hereinbefore depicted cooperate to the desired result. The circuitry shown and described hereinbefore and hereinafter minimizes the reliance upon software in order that those skilled in the art will better be able to apply the teachings herein to many different forms of display and/or, if so desired, will better be able to design the system at hand to use more or less software as is desired. Normally, the display system is up and running when the operator wishes to determine coordinate data. The clocking subsystem is in full operation and the clocking pulse train for operation of the circuitry according to the invention is applied at terminals 52'. The operator first places the circuitry in the calibrate mode by placing an up level on terminals 56' leading to the reset terminals of the R/C flip-flop circuit 150. The operator next places the probe 40' at a position on the display which is subsequently to delimit the upper left hand corner of the rectangle of displayed information. After placing the probe 40, the start/stop level is brought up by the operator, preferably by an actuate switch on the probe being closed at input terminal 58' which sets the $S/\overline{S}$ flip-flop 144 to start the operation. The state registers 176 . . . 182 are in the F state presenting binary electric levels $\phi\phi\phi\phi$ prior to the operator bringing the start/stop level to an up condition. In this state, the AND gate 222 is up and due to the applied clock pulse train, the circuitry will advance to initiate the A state presenting binary electric levels $1\phi\phi\phi$ which will bring the AND gating circuit 204 up. In turn, the X count circuit 250 and the Y count circuit 230 will be reset. The C/F flip-flop circuit 228 will be set to bring the Q output terminal up for coarse search and the $u/1$ CAL flip-flop 190 will be set to bring up the Q output terminal. The circuitry is now advanced into the detect mode by the occurrence of a subsequent clock pulse, after the AND gating circuit 192 is brought up by the binary electric level $1\phi\phi1$ representing the B state or RUN mode. In the B state, the detection proceeds by bringing up the enable input terminals of the X count and Y count registers 250 and 230, respectively. The presence of a change in the light level at the location of the probe 40' is sensed by the probe and its associated circuitry and indicated at input terminal 42'. The occurrence of this indication while in the B state in the CAL mode causes the current value of X count to be loaded to the $X_{min}$ register 264, and the current value of the Y count to be loaded to the $Y_{min}$ register. Automatically, the $u/1$ CAL flip-flop circuit 190 is switched to the other state in which the P output terminal is up for calibrating the lower right hand corner of the raster (FIG. 3) as indicated by the locus circle 372. The S/S flip-flop 144 and D/D flip-flop 174 are reset, indicating to the data processing system (and thereby to the operator) that the upper left hand corner of the display is calibrated. The operator places the probe 40' on the position of the display at which he would like to have the lower right hand corner of the displayed information to appear. The operator next restarts the detection process by placing an up level on the start/stop input terminals 58'. The occurrence of a clock pulse causes the detection circuitry to re-start at state B corresponding to binary electric level $1\phi\phi1$. Upon receiving an indication of a change in light level from the probe 40' and its associated circuitry, the circuitry according to the invention is arranged for automatically exiting the calibrate mode and records the values of the X count and Y count in the $X_{max}$ and $Y_{max}$ registers 266,276 respectively. When maximum values of $x$ and $y$ are detected, the D/$\overline{D}$ flip-flop 174 is reset indicating to the data processing system (and thereby to the operator) that the lower right hand corner has been calibrated. This stores values in the registers for confining the coordinate data determination in the ensuing operations to the values between these two points and any point determined outside this confine will be ignored automatically. In the RUN mode, thereafter, the flip-flop circuit 160 is set in the ready or Q output state, which also resets the D/$\overline{D}$ flip-flop circuit 174 to the non-detect state for the ensuing operation in determining the locus of a point within the confine of the two calibration points. The circuitry is now in the coarse search mode. In reality, a run mode is essentially a search mode of which the calibrate mode is only a part and which is bypassed during succeeding operations until recalibration is undergone. The contents of the $X_{min}$ register 264 is loaded into the X count register 250 and the circuitry cycles and recycles until a point is detected by the probe 130 responding to a change in light value. Each clock pulse is presented to the various registers, but the number of the pulse is not loaded until the probe 40' responds to a change in light level. The flowchart in the interest of clarity is effective as though clock pulses appear only during the desired scan times. Those skilled in the art will apply conventional practice to exclude clock pulses extraneous to the calculations desired where such would appear. Upon a point in the display being detected, the value in the Y count section 231 is tested to see if it is greater than the value in the $Y_{max}$ register 276, or equal to or less than this value. If is greater, the operation is terminated insofar as this point is concerned, because it lies outside the confines of the calibrating points. If it is equal to or less than $Y_{max}$, the cycle is reinitiated and the circuit is put in the C state of electric level $\phi\phi\phi1$ or fine SEARCH mode in which AND gating circuits 234 and 196 are up, the C/F flip-flop circuit 228 is set for P output and the circuitry operates on every scanning line henceforward, the R/C flip-flop circuit 150 is reset enabling the loading terminal of the X count register 250. In this mode, nondetect ($\overline{D}$) will terminate the operation, but a detect will bring up the D/$\overline{D}$ flip-flop circuit 174 and AND gating circuit 197 for storing the data in the form of the number of the clock pulse at which detection takes place and the set cycle is repeated on the next scanning line wherein the number of the clock pulse for the next detection is compared with the previous number for loading X count in register 250 contents into $X_1$ register 280 and Y count register 230 contents into $Y_1$ register 290 and so forth. The system exits when the X count for the scanning line succeeding the scanning line in which the center of the aperture circle is placed results in a change in sign at the output of the comparator circuit. This indicates that the previous lines contain the center of the aperture circle and the number of the scanning line in the $Y_1$ register for the previous scan is recognized as the Y coordinate. In one embodiment of the circuitry according to the invention, this process is essentially repeated by effectively looking at the coordinates from an orthogonal view oriented to determine the X coordinate of the center of the aperture circuit by the change of sign in the number of pixel across the aperture circle obtained at the completion of the next scan beyond that in which the center of the aperture circle lies. That is, the Y value of the center of the subtended circle is obtained accurately without calculation and the $x$ value must be calculated. The detection process can be continued so that the X value can be determined accurately without calculation.

In another embodiment of the circuitry, as actually illustrated in FIG. 6, the other, OR X, coordinate is determined simply by determining the pixel at the center of the coordinate determining scanning line either-/or, perhaps more precisely, that in the immediately preceding line of pixel by the arithmetic process described thereinbefore, that is, checking successive X values gives the correct Y coordinate of the subtended circle. Once the correct Y coordinate is obtained, successive Y values can be checked yielding the correct X coordinate. So, the coordinates of the center of the subtended circle can be obtained in the control circuitry by the method of successive approximations without an adder or subtracter in the control circuitry or in the host system.

The maximum writing rate of a DSDT in one embodiment of the invention, is 127,000 centimeters (50,000 inches) of line-segments per second at the target. The length of the raster at the target is 11,430 centimeters (4,500 inches), assuming a high resolution image of 1500 raster lines each 7.62 centimeters (3 inches) long. Consequently, the time for writing one raster detect pattern has an upper bound at 0.09 sec. (11 frames/sec). By skipping alternate raster lines, the upper bound is reduced to 0.045 sec. (22 frames/sec). Twenty-two frames per second is adequate response for the light probe. The aperture circle covers at least five scan lines (a reasonable number and a requirement which can be forced by the optics design), two of every three scan lines are skipped to generate a one-third density raster. The frame rate is 33 frames/sec and the time per frame is 0.030 sec/frame. For a one-third raster, using the successive approximations technique, the following nominal performance is obtained:

ERASE: 0.007 sec
DETECT: 0.030 sec
ERASE: 0.007 sec
RE-DISPLY: 0.090 sec
TOTAL CYCLE: 0.134 sec = 7.5 Hz The detect technique described alternately is used in an overlay mode in which the displayed data is not erased. Instead, the detect pattern is written over the displayed data and the detection occurs as before. In the overlay mode, the stored data is never written at the maximum gray scale intensity so that the addition of the detect pattern will generate variations in light level as it is written. The stored image will not contribute to the detection since the light level of the image is static and the detect pattern is the only varying component of the light intensity. Once the detection is made, a partial erase of the display is made so that only the lightly written detect pattern is removed. The following is nominal performance for the detection cycle.

0.030 sec: DETECT
0.007 sec: PARTIAL ERASE & RESTORE
0.037 sec: TOTAL CYCLE

The frame rate is approximately 27 Hz. In practice, it is often likely to be higher since a full erase is not required. The DETECT-PARTIAL ERASE time also applies to light probe utilization where the DSDT target is modified to provide a cursor writing area which is distinct from the data writing area. The detection time is independent of the erase time.

While the invention has been described in terms of a preferred embodiment, and variations thereof have been shown and/or described, it is clearly to be understood that those skilled in the art will apply the teachings of the invention in still other embodiments without departing from the spirit and scope of the invention as defined in the appended claims.

The invention claimed is:

1. An iterative coordinate datum approximation system for photoemissive pixel pattern displays, comprising
 an arrangement for displaying an optical image having a multiple of contiguous picture elements (pixel) varying in photoemission and disposed in regular succession in regular geometrical configuration defined in two dimensions of pixel increments,
 a photoresponsive device having an optical stop subtending a multiple of said pixel in a plurality of different portions of said contiguous disposition in regular succession, and
 logical circuitry iteratively cycled in accordance with said regular succession of disposition and responsive to said photoresponsive device for counting the number of pixel in each said portion of said multiple of pixel, for comparing successive counts of said portions, and for determining a change in sign in one iteration of comparisons of said successive counts,
 whereby said coordinate datum is the locus detected in the immediately preceding iteration and related to a number in said regular succession of pixel disposition.

2. An iterative coordinate datum approximation system for photoemissive pixel pattern displays, comprising
 a source of electric waves corresponding to an optical image in terms of a multiple of contiguous pixel disposed in a regular geometrical configuration defined in two dimensions and corresponding to the intensity of light at said multiple of pixel in a predetermined regular succession thereof in accordance with the display and the information to be displayed thereon,
 an arrangement coupled to said source of waves for generating said optical image and displaying the same,
 a photoresponsive probe element arranged for receiving photoemission emanating from said display,
 circuitry coupled to said source of electric waves and to said probe element for determining the locus of one pixel in said display with respect to the whole of said geometrical configuration,
 said photoresponsive probe element having an aperture stop encompassing a plurality of pixel including said one pixel and located over a plurality of successive pixel portions of said regular succession of pixel, and
 logical circuitry coupled to said source of waves and to said photoresponsive probe for determining the numbers of pixel in said portions, for comparing the numbers in successive portions, and for determining a change in the trend in one iteration of successive iterative comparisons,
 whereby said coordinate datum is the locus of one pixel detected in the immediately preceding iteration.

3. An iterative coordinate datum approximation system for photoemissive pixel pattern displays as defined in claim 2 and wherein,
 said arrangement for displaying said image comprises a cathode ray tube having electron beam generating means, and
 said source of waves provides a pair of defection waves for deflecting said electron beam and an image data wave for modulating the intensity of said electron beam in accordance with information to be displayed.

4. An iterative coordinate datum approximation system for photoemissive pixel pattern display, as defined in claim 3 and wherein,
 said arrangement for displaying said image also comprises
 a display screen spaced from said cathode ray display tube, and
 an optical system interposed between said cathode ray tube and said display screen for projecting the optical image thereon.

5. An iterative coordinate datum approximation system for photoemissive pixel pattern displays as defined in claim 4 and wherein
 said cathode ray tube is a deformographic storage display tube, and
 said optical system is a schlieren optical system.

6. An iterative coordinate data approximation system for a cathode ray beam tube display comprising;
 a cathode ray tube having a cathode ray beam forming electron gun assembly, a target assembly spaced at a distance from said gun assembly, electron beam deflecting components arranged along said tube intermediate said assemblies for deflecting the electron beam emanating from said gun assembly over said target assembly in a regular geometrical pixel configuration definable in two dimensions, and electron beam modulating circuitry arranged in conjunction with said tube for varying the intensity of said electron beam for displaying information;
 said system further comprising;
 a photoresponsive probe element arranged for receiving photoemission emanating from said target assembly,
 circuitry connected to said probe element for the detection of a predetermined characteristic of intensity of photoemission,
 circuitry coupled to said detection circuitry and to said electron beam deflecting components for determining the location of said detected photoemission with respect to the whole of said geometrical configuration, said probe element having a photoemissive aperture stop encompassing a plurality of pixel capable of exhibiting said predetermined level of intensity of photoemission, and said location determining circuitry having electronic logical circuitry cycled in accordance with said deflection of said electron beam over said regular pixel configuration and responsive to said photoresponsive probe element for counting the number of pixel in each said portion of said multiple of pixel, for comparing successive counts of said portions, and for determining a change in sign of succeeding comparisons of said successive counts, for resolving the location of the predetermined photoemissivity substantially at the center pixel of said aperture stop.

7. An iterative coordinate data approximation system for a cathode ray beam tube contiguous pixel pattern display comprising;

a cathode ray tube having a cathode ray beam forming electron gun assembly, a target assembly spaced at a distance from said gun assembly, electron beam deflecting components arranged along said tube intermediate said assemblies for deflecting the electron beam emanating from said gun assembly over said target assembly in contiguous lines defining a regular pixel geometrical configuration in two dimensions, and electron beam modulating circuitry arranged in conjunction with said tube for varying the intensity of said electron beam pixel by pixel for displaying information;

said system further comprising;

a photoresponsive probe element intercepting a multiple of contiguous pixel and arranged for receiving photoemission emanating from said target assembly, circuitry connected to said probe element for the detection of a predetermined characteristic of intensity of photoemission, circuitry coupled to said detection circuitry and to said electron beam deflecting components for determining the location of said detected photoemission with respect to the whole of said geometrical configuration, said probe element having a photoemissive aperture stop encompassing portions of a plurality of contiguous lines having a multiple of pixel capable of exhibiting said predetermined level of intensity of photoemission, and said location determining circuitry having electronic logical circuitry coupled to said beam deflecting components and to said photoresponsive probe element for determining the numbers of pixel in said portions, for comparing the numbers in successive portions, and for determining a change in the trend of successive comparisons, for resolving the location of the predetermined photoemissivity and thereby determining said coordinate data substantially at the center pixel of said aperture stop.

8. An iterative coordinate data approximation system for a cathode ray beam tube contiguous pixel pattern display, comprising a cathode ray tube having a cathode ray beam forming electron gun assembly, a target assembly spaced at a distance from said gun assembly, electron beam deflecting components arranged along said tube intermediate said assemblies for deflecting the electron beam emanating from said gun assembly over said target assembly in contiguous lines defining a regular geometrical configuration in two dimensions, and electron beam modulating circuitry arranged in conjunction with said tube for varying the intensity of said electron beam pixel by pixel for displaying information;

a photoresponsive probe element having a photoemissive aperture stop intercepting a multiple of contiguous pixel in portions of a plurality of contiguous lines having a multiple of contiguous pixel capable of exhibiting a predetermined characteristic level of intensity of photoemission and arranged for receiving photoemission emanating from said target assembly, circuitry connected to said probe element for the detection of said predetermined characteristic of intensity of photoemission, circuitry coupled to said detection circuitry and to said electron beam deflecting components for determining the location of said detected photoemission with respect to the whole of said geometrical configuration, comprising input terminals to which a train of clocking pulse transitions are applied, gating circuitry connected to said input terminals and to said detection circuitry for producing output pulse transitions at clocking rate during detection only of the presence of said electron beam at the pixel intercepted by said probe element, counting circuitry coupled to said gating circuitry for counting said pulse transitions, registering circuitry, transferring circuitry intercoupling said counting and said registering circuitry for transferring a count from said counting circuitry to said registering circuitry, comparing circuitry coupled to said counting and said registering circuitry for deriving a comparison of the contents of said counting and registering circuitry, storing circuitry for storing comparisons, transfer circuitry coupled to said comparing and said storing circuitry for transferring the resulting comparison to said storing circuitry, sensing circuitry coupled between said comparing circuitry and said storing circuitry for sensing a change in sign of the difference between the comparisons stored, further circuitry connected to said sensing circuitry and responsive thereto for delivering coordinate data stored in said counting circuitry at the change of sign sensed by the sensing circuitry and thereby determining said coordinate data substantially at the center pixel of said aperture stop.

9. An iterative coordinate data approximation system for a cathode ray beam tube contiguous pixel pattern display as defined in claim 8 and wherein said counting circuitry comprises two sections of counting stages with one stage having a carry output terminal and the other stage having a carry input terminal, a binary switching circuit having one output terminal for delivering an electric level reperesentative of coarse/fine scanning and having an input terminal, a gating circuit having one input terminal connected to the output terminal of said binary switching circuit, another input terminal connected to said carry output terminal, and an output terminal connected to said carry input terminal of said two sections of counting stages, and circuitry for controlling the coarse/fine scanning and having one terminal connected to said input terminal of said binary switching circuit.

10. A iterative coordinate data approximation system for a cathode ray beam tube contiguous pixel pattern display as defined in claim 9 and wherein said binary switching circuit is a bilateral flip-flop circuit, and said gating circuit is an AND gating circuit.

11. An iterative coordinate data approximation system for a cathode ray beam tube contiguous pixel pattern display as defined in claim 8 and wherein said location determining circuitry comprises, one pair of coordinate data delimiting registers connected to said counting circuitry for storing numbers representative of the coordinates of one locus on said display and having loading control level input terminals, one binary switching circuit having one output terminal for delivering an electric output level to said loading control input terminals and having one input level for applying an electic level for loading said registers with delimiting data, and circuitry connected to said detection circuitry for effecting the loading of data from said counting circuitry to said data delimiting registers at the detection of said electron beam at the pixel intercepted by said probe element.

12. An iterative coordinate data approximation system for a cathode ray beam tube contiguous pixel pattern display as defined in claim 11 and wherein said location determining circuitry further comprises, another pair of coordinate data delimiting registers connected to said counting circuitry and having loading control level input terminals, another binary switching circuit having a pair of output terminals individually coupled to said loading control terminals of said one pair of delimiting register and of said other pair of delimiting registers, thereby rendering but one pair loadable at a time, said other binary switching circuit having an input terminal connected to said detection circuitry for resetting the switching circuit and another input terminal coupled to said one binary switching circuit for selecting said one pair of delimiting registers intially, thereby numbers corresponding to two delimiting loci are stored.

13. An iterative coordinate data approximation system for a cathode ray beam tube contiguous pixel pattern display as defined in claim 12 and wherein said binary switching circuits are bilateral flip-flop circuits.

14. An iterative coordinate data approximation system for a cathode ray beam tube contiguous pixel pattern display as defined in claim 12 and wherein said location determining circuitry comprises further logical circuitry interposed in said connections between said counting and registering circuitry and said delimiting registers for excluding data extra with respect to numbers between the numbers stored in said delimiting registers.

15. A machine method for determining coordinate data for photoemissive contiguous pixel pattern displays by iteration, comprising the steps of generating electric waves for controlling a display arrangement for producing an optical image of contiguous photoemissive pixel in a regular succession of data varying in photoemission and defining an optical image in two dimensions of regular geometrical configuration, detecting a predetermined level of photoemission from said image at a multiple of pixel and in a plurality of portions of successive pixel, comparing the number of pixel in one said portion with the number in a succeeding portion, comparing the result of said comparing, and repeating the iterative sequence of detecting and comparing until the result of comparing said results differs in significant character from said previous comparisons, whereby the data sought is found in the immediately preceding iteration.

* * * * *